April 21, 1970     K. H. JOHNSTON     3,507,379

POWER CURVE

Filed March 28, 1968     2 Sheets-Sheet 1

INVENTOR.
Kenneth H. Johnston
BY
Wood, Herron & Evans
ATTORNEYS

April 21, 1970  K. H. JOHNSTON  3,507,379

POWER CURVE

Filed March 28, 1968  2 Sheets-Sheet 2

INVENTOR.
Kenneth H. Johnston
BY
Wood, Herron & Evans
ATTORNEYS

United States Patent Office 3,507,379
Patented Apr. 21, 1970

1

3,507,379
POWER CURVE
Kenneth H. Johnston, Cleves, Ohio, assignor to Associated Millwrights, Inc., Cincinnati, Ohio, a corporation of Ohio
Filed Mar. 28, 1968, Ser. No. 716,738
Int. Cl. B65g 47/00
U.S. Cl. 198—28                                                5 Claims

ABSTRACT OF THE DISCLOSURE

A power curve for transferring an article from a feed path that is angularly positioned relative to a discharge path, a turn angle being established between the two paths, comprising, in preferred form, (a) a transfer plate positioned between the two paths to provide a turn surface having an arcuate center line joining the center lines of the two paths, the center point of the arcuate center line being the center point of the turn angle, (b) structure defining a hole in the transfer plate, (c) a wheel mounted beneath the transfer plate and positioned so that a portion of the wheel periphery extends up through the hole, the wheel axis being positioned parallel with a line bisecting the turn angle, and (d) drive means for rotating the wheel.

---

This invention relates to conveyor systems and, more particularly, relates to a novel power curve that is particularly useful for interconnecting two conveyors angularly disposed one to the other.

Generally speaking, a conveyor system is defined as a materials handling machine that moves a series of articles over fixed horizontal, declined and/or inclined paths. Such apparatus is designed to move individual articles over the desired path of travel in either continuous or intermittent motion. Conveyors may be broadly classed into two primary groups, namely, gravity conveyors where the actuating force for moving an article along the conveyor path is the force of gravity and power conveyors where the actuating force may be compressed air or suction, vibration, or various drives such as continuous belts, chains, or cables. Gravity conveyors typically include those of the sliding friction type, for example, chutes, and those of roller friction type, for example, skate wheels. Powered drive conveyors typically include those of the continuous belt type, for example, fabric or woven mesh belts, and those of the chain type, for example, push bar or cleat chains.

A conveyor system very seldom is fabricated with only a single, straight line conveying path. Conveyor systems used for purposes such as, for example, warehousing operations, normally include a series of straight line conveyors to establish a conveyor path. Oftentimes portions of the overall conveyor path will be inclined or declined realtive to the horizontal. A complete conveyor path will also generally include right angle turns or other angle turns, as required, to achieve efficient conveying of the articles and economical use of the space available. Such curved turns may relate two horizontal conveyors, a horizontal conveyor and an inclined conveyor, two inclined conveyors, and so forth.

As a general rule, in both the gravity and the powered types of conveyors the curve section associated with two successive straight line conveyors that are angularly disposed one to the other will generally be a passive turn in the sense that the curve section does not provide positive means for moving the article between the end of the upstream or infeed conveyor and the start of the downstream or discharge conveyor. Such turns may be in the form of a smooth transfer plate or may be provided with

2 a series of skate wheels. In both cases the articles pushed into the turn area by the upstream conveyor are pushed around that curve area (the articles being directed around the turn by guide rails) and over onto the downstream conveyor by the force exerted on them because of subsequent articles pushing them from behind. Such passive turns are useful under a number of operating circumstances but, generally speaking, their operative relationship to the upstream and downstream conveyors is such that the article being transferred, for example, a carton or box, must be rather sturdy to withstand the necessary forces required to push it over the turn area between the two conveyors.

Power curves are known to the art and they function by positively carrying or moving an article along the arcuate turn or curve path between, for example, two straight line conveyors. That is, the article is passed onto the power curve from the upstream conveyor section, is positively moved around the curve or turn path relating the two conveyors by the drive mechanism of the power curve and, hence, is transferred onto the downstream conveyor section for subsequent movement as desired. One type of power curve that is known includes a rubberized belt disposed between two rollers positioned at right angles one to the other. The belt is maintained in an arcuate path by holding the belt in place along the curve's outer periphery. The belt is positively driven, as are the straight line conveyors, so that the article is laways positively moved even while it is within the curved area interconnecting the upstream and downstream conveyors. Such a power curve section is relatively expensive, requires complex structure to carry out its function, and is difficult to maintain in operating condition. Another type power curve that is known to the prior art includes, as the conveying surface, a series of slats linked together in belt-like configuration. The slats are configured so that they may be canted one to the other, thereby permitting a length of the hooked together slats to form a curved path. This belt of slats is driven by relatively complex drive means and is generally rather limited in use to arcuate curves of a relatively large radius.

It has been the primary objective of this invention to provide an improved power curve that is relatively simple of structure and is easy to maintain in operating condition.

In achieving this objective, this invention is directed to a power curve for transferring an article from an infeed path to a discharge path where the paths are angularly positioned one to the other, a turn angle being established between the two paths. The power curve includes, in preferred form, (a) a transfer plate positioned between the two paths to provide a turn surface having an arcuate center line joining the center lines of the two paths, the center point of the arcuate center line being the center point of the turn angle, (b) structure defining a hole in the transfer plate, (c) a wheel mounted beneath the transfer plate and positioned so that a portion of the wheel extends up through the hole, the wheel axis being positioned parallel with a line bisecting the turn angle, and (d) drive means for rotating the wheel.

Other objectives and advantages will be more apparent from the following detailed description taken in conjunction with the drawings in which.

Figure 1:
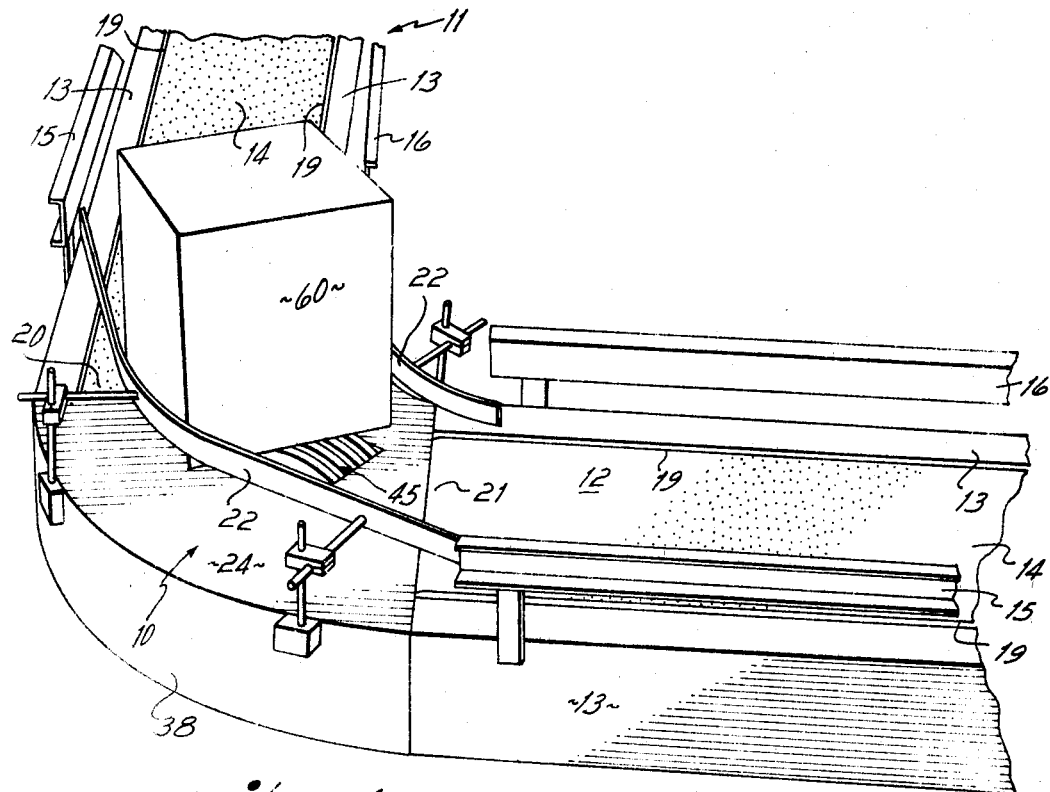
FIGURE 1 is a perspective view of a power curve formed in accordance with the principles of this invention.

As illustrated in FIGURE 1, the power curve 10 is useful in a conveyor system which includes an upstream conveyor section 11 that provides a feed path and a downstream conveyor section 12 that provides a discharge path, the conveyors and, hence, the paths, being disposed at an angular position one to the other. The angular position of the two paths established by the conveyors 11, 12 defines a turn angle 9 and, as seen from FIGURE 2, the turn angle for the power curve illustrated is a right angle. It will be understood that the power curve 10 of this invention can be used to relate a feed path and a discharge path disposed at substantially any turn angle relative one to the other where that angle is about 90° or less. If, for example, a turn angle of about 180° is required two power curves 10 in accordance with this invention may be abutted together in tandem.

Figure 2:
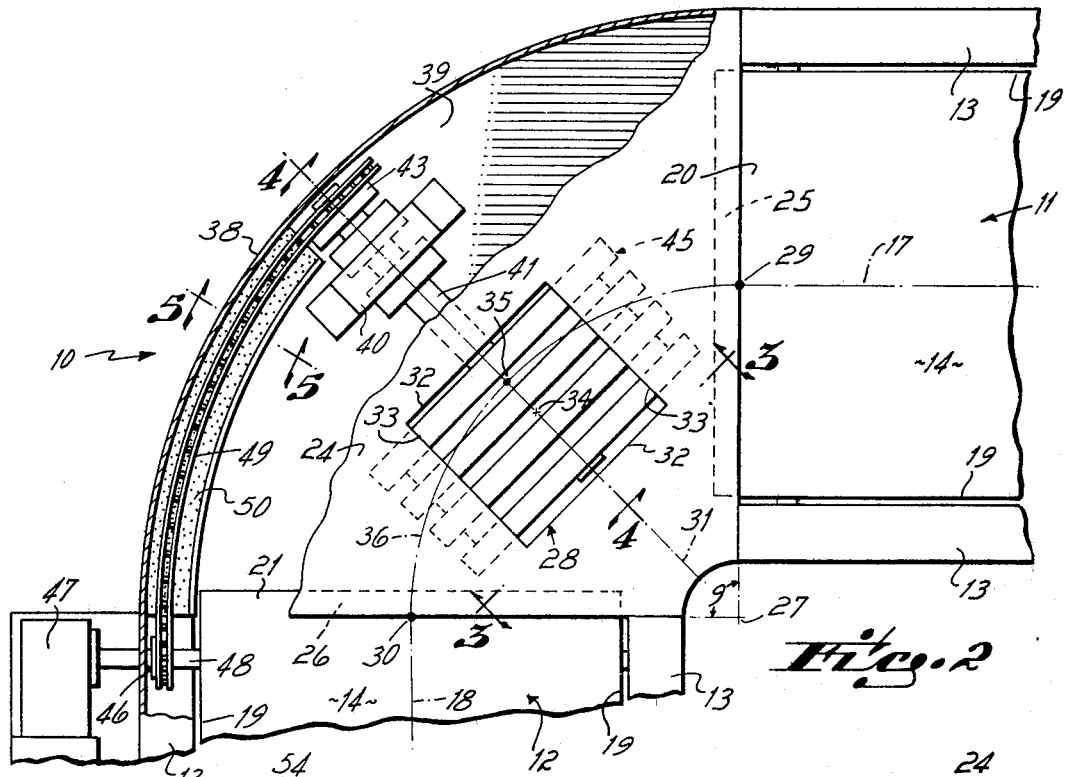
FIGURE 2 is a top view of the power curve.

Each conveyor 11, 12 illustrated is of a typical powered type and includes a base frame 13 and an endless belt 14, the belt being driven by drive means, not shown. Each conveyor 11, 12 is provided with guide rails 15, 16 which establish the feed path center line 17 for the upstream conveyor 11 and the discharge path center line 18 for the downstream conveyor 12 (FIGURE 2). The imaginary center lines 17, 18 are parallel to the travel path of their respective conveyor belts 14 and they are defined as being equidistant between the two guide rails 15, 16. If the conveyor section 11 or 12 does not have guide rails 15, 16 the center lines 17, 18 would be those imaginary lines equidistant between opposed sides 19 of the conveyor belts 14. In any event, the feed center line 17 and discharge center line 18 represent the approximate travel paths that an article follows in approaching the power curve 10 and in leaving the power curve.

The power curve 10 of this invention is positioned between the downstream end 20 of the upstream conveyor 11 and the upstream end 21 of the downstream conveyor 12. The power curve 10 is positioned between the two conveyors 11, 12 to provide transfer means for positively moving articles carried by the conveyor system from the upstream conveyor 11 to the downstream conveyor 12. The power curve 10 also may be provided with guide rails 22 if desired.

As is more particularly illustrated in FIGURE 2, the power curve 10 of this invention includes an article support in the form of a transfer plate 24 positioned to overlap, as at 25, 26, related conveyor section ends 20, 21. This transfer plate 24 provides a turn surface in the same horizontal plane as the feed path 17 and discharge path 18. The transfer plate is dimensioned to provide an imaginary arcuate center line 36 that joins the feed path 17 and discharge path 18 center lines of the upstream 11 and downstream 12 conveyors at points 29, 30, that is, the arcuate center line 36 terminates at points 29, 30. The arcuate center line 36 has a center point 27. Thus, imaginary lines drawn to interconnect points 27, 29 and points 27, 30 define the power curve or turn angle 9 and, thus, represent the sides of the angle 9. The center point of the turn angle preferably is the same as the center point 27 of the arcuate center line 36.

A hole 28 is provided in the transfer plate 24 that is preferably rectangular in configuration. The hole 28 is preferably centered on an imaginary line 31 that bisects the turn angle 9. Thus, in the case of the rectangular hole 28, the sides 32 of the hole are perpendicular to the bisecting line 31 and the ends 33 of the hole are parallel to the bisecting line. The center 34 of the hole 28 is positioned on the bisecting line 31 near the intersection 35 of the arcuate center line 36 and the line 31. Preferably, the distance between the intersection 35 and the hole center 34 is not more than about 15% of the peripheral length of the arcuate center line 36, the peripheral length of the arcuate center line being that length between terminal points 29, 30 of the arcuate center line.

The transfer plate 24 is mounted to a curved side wall 38 that, in turn is connected to a mounting plate 39, the mounting plate being suitably supported to maintain the transfer plate in the desired horizontal working plane. The mounting plate 39 carries a bearing block 40. The bearing block 40 supports an axle 41 that extends through the block, one end of the axle being provided with a drive sprocket 43 and the other end mounting a wheel 45. The axle 41 and, hence, the axis of the wheel 45, is preferably aligned with the center point 27 of the turn angle 9. Preferably the axle 41 is also aligned parallel with the line 31 bisecting the angle 9. The drive sprocket 43 is connected with a transfer sprocket 46 related to gear reducer 47 through shaft 48. The gear reducer 47 is driven by a motor, not shown. The drive sprocket 43 is related to the transfer sprocket by a side bow chain 49 that is maintained in bow-like configuration around the inner periphery of the sidewall 38 by a channel guide 50 connected to the side wall. The motor, through gear reducer 47, may also be used to drive the conveyor belt 14 for one of the conveyor sections 11 or 12 if desired. The transfer plate 24 may be hinged or otherwise latched to its support structure so it may be easily pivoted out of or removed from its operating position, thereby exposing the wheel 45 and associated drive means for maintenance purposes.

Figure 3:
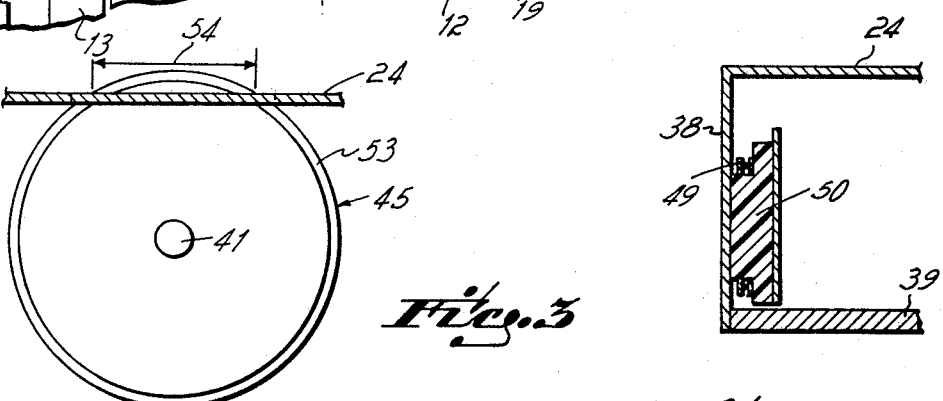
FIGURE 3 is a cross-sectional view taken along lines 3—3 of FIGURE 2.
Figure 5:
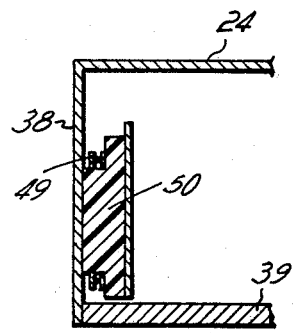
FIGURE 5 is a cross-sectional view taken along lines 5—5 of FIGURE 2.

As illustrated in FIGURE 3, the wheel 45 is positioned beneath the hole 28 in the transfer plate 24 so that a portion of the wheel's periphery 53 protrudes up through the hole. The chord 54 on the wheel 45 traced by the transfer plate's top surface when the wheel is in operating position is preferably of a length between about 20% and about 60% of the arcuate center line's peripheral length. As illustrated in FIGURE 3 the length of chord 54 is about 35% of the center line's peripheral length. As for the wheel 45 itself, it is preferred that the wheel width be between about 15% and about 45% of the arcuate center line's peripheral length. As illustrated in FIGURE 2 the wheel width is about 30% of the center line's peripheral length. It is preferred that the diameter of the wheel 45 be between about 30% and about 80% of the arcuate center line's peripheral length. As illustrated in FIGURE 2 the diameter of the wheel is about 60% of the center line's peripheral length. Of course, the hole 28 in the transfer plate 24 must be dimensioned so as to receive the wheel 45 formed in accordance with these preferred wheel dimension ranges.

Figure 4:
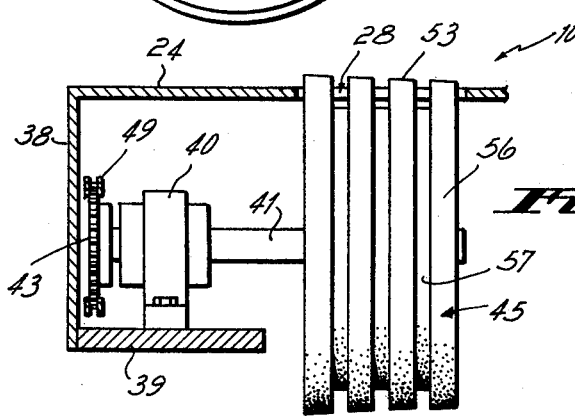
FIGURE 4 is a cross-sectional view taken along lines 4—4 of FIGURE 2.

The wheel 45 illustrated in FIGURE 4 comprises four gum rubber tires 56 spaced one from the other by wooden spacers 57. The wheel periphery 53 is preferably tapered slightly toward the center point 27 of the arcuate center line 36. This wheel surface taper aids in moving articles around the turn as it tends to move them toward the center 27 of the arcuate turn, thereby preventing jam-ups on the curve. This partcular wheel 45 structure has been found most useful when transferring cartons as it is able to withstand cartons of relatively heavy weight.

Figures 6, 7:
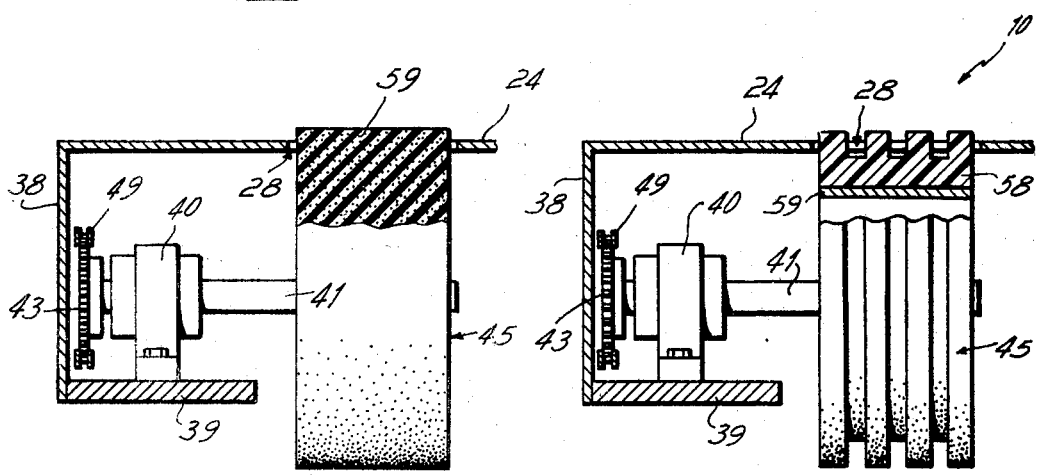
FIGURE 6 is a view similar to FIGURE 4 illustrating a first alternative embodiment of the wheel used in the power curve.
FIGURE 7 is a view similar to FIGURE 6 illustrating a second alternative embodiment of the wheel used in the power curve.

An alternative wheel structure is illustrated in FIGURE 6 where the wheel 45 is formed of sponge rubber. In this particular embodiment a single piece of sponge rubber 59 is used and, of course, this provides a high degree of flexibility for that portion of the wheel periphery exposed through the hole 28 in the transfer plate 24.

A second alternative wheel 45 structure is illustrated in FIGURE 7. In this particular embodiment a single tire 58 having four treads has been integrally molded from a urethane rubber onto a tubular rim 59. Such a tire structure provides an economical wheel 45 structure for use in commercial installations.

Generally speaking, substantially any material may be used for the wheel 45 that will provide the necessary coefficient of friction to establish positive movement of articles from the upstream conveyor 11, through the power curve 10, to the downstream conveyor 12. However, choice of the material used will primarily depend upon the type of package or article being mover along the conveyor system. For example, if relatively heavy cartons or boxes 60 are being conveyed it is preferred that the wheel composition be of a relatively hard natural or synthetic rubber. Such a relatively high density material is desired because it provides a relatively long service life for the wheel. On the other hand, it is preferred that when handling light boxes or flimsy packages, for example, paper towels or toilet tissue wrapped in paper or plastic film, it is preferred to use a natural or synthetic sponge rubber for the wheel 45. This for the reason that such a material has "give" to it so that it tends to flex when the flimsy packages are grabbed by the wheel 45 to move those packages around the curve. If a hard rubber were used, such as is used with heavy articles, the surface of the wheel 45 would tend to grab the flimsy package and tear the packaging material. Thus, as a general rule, it can be said that the wheel composition depends on the weight of the article being conveyed and the type packaging used for that article, that is, whether or not a carton or paper or plastic film wrapping is used.

In operation, the peripheral speed of the wheel 45 is preferably regulated so that it moves at substantially the same speed as the conveyor belts 14 in each conveyor section 11, 12. The article 60 is moved by the upstream conveyor 11 onto the transfer plate 24 and the upstream conveyor moves it into engagement with the leading edge of the wheel 45. The wheel 45, because it is positioned at at 45° angle relative to the right angled center lines of the upstream 11 and downstream 12 conveyors, efficiently moves the product across the transfer plate 24 onto the downstream conveyor 12. Guide rails 22 associated with the power curve 10 may aid in guiding the package around the turn from the upstream conveyor 11 to the downstream conveyor 12. However, if the wheel's periphery is tapered inwardly toward the center point 27 of the turn angle 9 (see FIGURE 4) guide rails 22 may not be needed. The taper in the wheel's surface aids in maintaining the article on the desired travel path (the arcuate center line 26) over the transfer plate 24 and banks it toward the inside of the curve, thereby preventing it from being "thrown off" the power curve before it reaches the downstream conveyor 12.

The power curve has been described in an environment where both the infeed conveyor path 17 and discharge conveyor path 18 are in a horizontal plane. However, it will be understood that the power curve of this invention can be utilized when either one or both of the paths 17, 18 are inclined or declined. For example, if both the infeed path 17 and discharge path 18 are inclined relative one to the other, and if they are also positioned at a right angle relative one of the other, the power curve illustrated in FIGURES 1 and 2 may be used to relate the two conveyor sections. In this instance, the transfer plate 24 will be positioned in a horizontal plane while the infeed 17 and discharge 18 paths will be in an inclined attitude, thereby providing a "step" between the two paths.

Although the above described invention has been completely set forth in terms of its preferred embodiments, it will be obvious to those skilled in the art that changes and modifications may be made in the power curve structure without departing from the intent and scope of the invention, as defined in the appended claims.

What I desire to claim and protect by Letters Patent is:

1. A power curve for transferring an article from a feed path that is positioned at a right angle relative to a discharge path, a turn angle being established between the two paths, comprising
   a transfer plate positioned between the two paths to provide a turn surface having an arcuate center line joining the center lines of the two paths, the center point of the arcuate center line being the same as the center point of the turn angle,
   a single driven wheel mounted beneath said transfer plate and positioned so that a portion of the wheel's periphery extends up through a hole in said transfer plate, the wheel paxis being aligned with the center point of the turn angle and being aligned with the line bisecting the turn angle,
   said single driven wheel further being of a diameter between about 30% and about 80% of the arcuate center line's peripheral length, being of a width between about 15% and about 45% of the arcuate center line's peripheral length, and being positioned so that the top surface of said transfer plate traces a cord on the wheel of a length between about 20% and about 60% of the arcuate center line's peripheral length,
   drive means positioned beneath said transfer plate, for rotating said wheel, and
   a guide rail disposed above the turn surface.

2. A power curve as set forth in claim 1 wherein the wheel surface is formed of a material selected from the group consisting of natural and synthetic rubber.

3. A power curve as set forth in claim 2 wherein the periphery of the wheel is formed of a sponge-type rubber.

4. A power curve as set forth in claim 1 wherein the center of the hole in said transfer plate is positined toward the center point of the turn angle from the arcuate center line a distance not more than about 15% of the peripheral length of the arcuate center, and
   wherein the periphery of said driven wheel is slightly tapered toward the center point of the arcuate center line.

5. A power curve as set forth in claim 4 wherein said transfer plate is pivotally mounted to permit movement between a substantially horizontal position and a substantially vertical position to provide easy access to said driven wheel for maintenance purposes.

References Cited

UNITED STATES PATENTS

| | | | |
|---|---|---|---|
| 2,759,585 | 8/1956 | Timmons | 193—36 |
| 3,209,880 | 10/1965 | Dietiker | 193—37 |
| 3,254,752 | 6/1966 | Bauch et al. | 193—36 |

RICHARD E. AEGERTER, Primary Examiner